(12) United States Patent
Wang

(10) Patent No.: US 11,758,442 B2
(45) Date of Patent: Sep. 12, 2023

(54) INFORMATION PROCESSING METHOD AND DEVICE

(71) Applicant: DATANG MOBILE COMMUNICATIONS EQUIPMENT CO., LTD., Beijing (CN)

(72) Inventor: Hucheng Wang, Beijing (CN)

(73) Assignee: DATANG MOBILE COMMUNICATIONS EQUIPMENT CO., LTD., Beijing (CN)

(*) Notice: Subject to any disclaimer, the term of this patent is extended or adjusted under 35 U.S.C. 154(b) by 0 days.

(21) Appl. No.: 17/952,504

(22) Filed: Sep. 26, 2022

(65) Prior Publication Data

US 2023/0013493 A1 Jan. 19, 2023

Related U.S. Application Data

(63) Continuation of application No. 16/610,255, filed as application No. PCT/CN2018/084260 on Apr. 24, 2018, now abandoned.

(30) Foreign Application Priority Data

May 2, 2017 (CN) .......................... 201710301629.3

(51) Int. Cl.
*H04W 36/00* (2009.01)
*H04W 76/25* (2018.01)
(Continued)

(52) U.S. Cl.
CPC ....... *H04W 36/0022* (2013.01); *H04W 36/00* (2013.01); *H04W 36/14* (2013.01);
(Continued)

(58) Field of Classification Search
CPC . H04W 36/0022; H04W 36/00; H04W 36/14; H04W 60/00; H04W 76/18;
(Continued)

(56) References Cited

U.S. PATENT DOCUMENTS

2010/0135255 A1 6/2010 Zhang et al.
2013/0150041 A1 6/2013 Shaheen
(Continued)

FOREIGN PATENT DOCUMENTS

| CN | 101374342 A | 2/2009 |
|----|-------------|--------|
| CN | 102905369 A | 1/2013 |

(Continued)

OTHER PUBLICATIONS

He et al, "Intelligent Fuzzing Algorithm for 5G NAS Protocol Based on Predefined Rules", IEEE 2022 (Year: 2022).*

(Continued)

*Primary Examiner* — Omer S Mian
(74) *Attorney, Agent, or Firm* — HARNESS, DICKEY & PIERCE, P.L.C.

(57) ABSTRACT

The preset disclosure provides an information processing method and device. The information processing method is performed by a user equipment (UE) operating in a single registration mode, and includes: receiving assistance information from a first network; initiating an attaching or initial registration procedure according to the assistance information received from the first network when moving between the first network and a second network, the first and second networks utilizing different access technologies.

10 Claims, 5 Drawing Sheets

(51) Int. Cl.

| | | |
|---|---|---|
| *H04W 76/18* | (2018.01) | |
| *H04W 76/27* | (2018.01) | |
| *H04W 36/14* | (2009.01) | |
| *H04W 60/00* | (2009.01) | |
| *H04W 88/06* | (2009.01) | |

(52) U.S. Cl.
CPC ........... *H04W 60/00* (2013.01); *H04W 76/18* (2018.02); *H04W 76/25* (2018.02); *H04W 76/27* (2018.02); *H04W 88/06* (2013.01)

(58) Field of Classification Search
CPC ..... H04W 76/25; H04W 76/27; H04W 88/06; H04W 48/18; H04W 36/0066
See application file for complete search history.

(56) References Cited

U.S. PATENT DOCUMENTS

| | | | |
|---|---|---|---|
| 2015/0065137 A1 | 3/2015 | De Pasquale et al. | |
| 2019/0150219 A1* | 5/2019 | Wang | H04W 48/18 370/329 |
| 2019/0253944 A1* | 8/2019 | Kim | H04W 36/08 |
| 2020/0120482 A1* | 4/2020 | Parkvall | H04L 5/0053 |

FOREIGN PATENT DOCUMENTS

| | | |
|---|---|---|
| WO | WO-2015/050547 A1 | 4/2015 |
| WO | WO-2016/195617 A1 | 12/2016 |

OTHER PUBLICATIONS

European Search Report dated Apr. 7, 2020, issued in corresponding European Application No. 18793896.
International Search Report dated Jun. 28, 2018, issued in corresponding International Application No. PCT/CN2018/084260.
International Preliminary Report on Patentability dated Nov. 5, 2019, issued in corresponding International Application No. PCT/CN2018/084260.
Ericsson, '23.501 : Single registration with no Nx interface', 3GPP draft; S2-171756, 3rd Generation Partnership Project (3GPP), SA WG2 Meeting #120, Mar. 2017.
Qualcomm Incorporated, 'Mobility inside 5GC and between 5GC and EPC for interworking scenarios', 3GPP draft; S2-170743, 3rd Generation Partnership Project (3GPP), SA WG2 Meeting #S2-119, Feb. 2017.
Office Action dated Mar. 1, 2020, issued in corresponding Chinese Application No. 201710301629.3.
Samsung, 'Mobility without Nx support in single-registration mode' 3rd Generation Partnership Project (3GPP), SA WG2 Meeting #120, S2-172251, Mar. 21, 2017.
Dubrovnik 'Interworking between NGC and EPC' Working draft, S2-1709, Feb. 7, 2017.
Written Opinion dated Jun. 28, 2018, issued in corresponding International Application No. PCT/CN2018/084260.
Korean Office Action for KR Application No. 10-2019-7035090 dated Nov. 9, 2020.
Nokia, "TS 23.501: PCR to update Single registration mode", SA WG2 Meeting #121, S2-172828, Busan, Korea, Mar. 27-31, 2017.
Japanese Office Action for JP Application No. 2019-560649 dated Dec. 17, 2020.
3GPP TS 23.501, V16.2.0 3rd Generation Partnership Project; Technical Specification Group Services and System Aspects; System Architecture for the 5G System (5GS); Stage 2, Release 16, Sep. 2019.
3GPP TS 23.502, V16.5.1 3rd Generation Partnership Project; Technical Specification Group Services and System Aspects; Procedures for the 5G System (5GS); Stage 2, Release 16, Aug. 2020.
LG Electronics, "Way forward for Interworking", SA WG2 Temporary Document, SA WG2 Meeting #119, S2-171004, Feb. 13-17, 2017, Dubrovnik, HR.
Japanese Office Action dated Aug. 25, 2021 for Japanese Patent Application No. 2019-560649.
Huawai, "Inter-system mobility cases", Agenda Item 10.6.2.2, 3GPP TSG-RAN WG3 AH, R3-170229, Spokane, WA, Jan. 17-19, 2017.
Gu Res et al, "A Comprehensive Survey on Mobility Management in 5G Heterogeneous Networks: Architectures, Challenges and Solutions", IEEE Access, 2020 (Year: 2020).
Pencheva et al, "Open Access to Intersystem Handover Control Using Multi-access Edge Computing", IEEE, 2018 (Year: 2018).

* cited by examiner

INFORMATION PROCESSING METHOD AND DEVICE

CROSS-REFERENCE TO RELATED APPLICATION

This application is a continuation application of U.S. application Ser. No. 16/610,255, filed on Nov. 1, 2019, which is the national phase of International Application No. PCT/CN2018/084260, filed on Apr. 24, 2018, and claims priority to Chinese Patent Application No. 201710301629.3 filed on May 2, 2017, the disclosures of each of which are incorporated in their entirety by reference herein.

TECHNICAL FIELD

The present disclosure relates to the field of communication technology, in particular to an information processing method and device.

BACKGROUND

With the development of communication technologies, 5G networks need to support an interoperation with Long Term Evolution (LTE) networks. However, the interoperability between the 5G Core Network (5GC) and the Evolved Packet Core (EPC) is completely determined by the operator's deployment, that is, whether the Nx interface is supported is determined by the operator. However, some terminal-side manufacturers do not prefer to support the dual registration mode which may affect the terminal. Therefore, there may be a scenario where the terminal capability does not match the network capability. That is, the terminal supports merely the single registration mode, and the network does not support the Nx interface. In this case, when the UE moves between the 5G and LTE networks, the mobility management process may fail.

SUMMARY

In view of this, the present disclosure provides an information processing method and device to avoid the problem of mobility management failure when a terminal is moving among networks of different access technologies, thereby ensuring the communication quality.

To solve the above problem, the present disclosure provides an information processing method performed by a user equipment (UE) operating in a single registration mode, including: receiving assistance information from a first network; initiating an attaching or initial registration procedure according to the assistance information received from the first network when the UE is moving between the first network and a second network, the first and second networks utilizing different access technologies.

In some alternative embodiments, the step of initiating an attaching or initial registration procedure according to the assistance information received from the first network when the UE is moving between the first network and a second network includes: determining whether the UE in single registration mode can be supported in the first network according to the assistance information received from the first network; initiating the attaching or initial registration procedure when accessing the second network, if the UE in single registration mode cannot be supported in the first network.

In some alternative embodiments, the assistance information includes: NAS level indication or registration mode negotiated on the NAS level; the step of determining whether the UE in single registration mode can be supported in the first network according to the assistance information received from the first network includes: determining whether the UE in single registration mode can be supported in the first network according to the NAS level indication or a result of the registration mode negotiation.

In some alternative embodiments, the assistance information includes: neighborhood measurement information; the step of determining whether the UE in single registration mode can be supported in the first network according to the assistance information received from the first network includes: determining that the UE in single registration mode cannot be supported in the first network, if the neighborhood measurement information does not include information about any cell of the access technology which the second network utilizes.

In some alternative embodiments, the step of initiating an attaching or initial registration procedure according to the assistance information received from a first network when the UE is moving between the first network and a second network includes: determining whether an access to the second network is needed according to the assistance information received from the first network; initiating the attaching or initial registration procedure when accessing the second network, if the access to the second network is needed.

In some alternative embodiments, the assistance information includes: an instruction sent by a base station in the first network through an RRC message, the instruction including: information about cells of the second network; or an indication that switching among different access technologies is not supported; or an instruction of performing a reselection to the second network.

In some alternative embodiments, the RRC message is an RRC connection release message.

In some alternative embodiments, the instruction is sent when the first network fails to switch among different access technologies.

In some alternative embodiments, the assistance information includes: an instruction sent by a core network in the first network through an NAS message, the instruction including: an instruction of performing a reselection to the second network.

In a second aspect, an embodiment of the present disclosure provides an information processing method performed by a network-side equipment of a first network, including: acquiring assistance information; sending the assistance information to a UE operating in a single registration mode, the UE initiating an attaching or initial registration procedure according to the assistance information received from the first network when moving between the first network and a second network.

In some alternative embodiments, the assistance information includes: NAS level indication or registration mode negotiated on the NAS level; or the assistance information includes: neighborhood measurement information; or the assistance information includes: an instruction sent by a base station in the first network through an RRC message, the instruction including: information about cells of the second network; or an indication that switching among different access technologies is not supported; or an instruction of performing a reselection to the second network; or the assistance information includes: an instruction sent by a core network in the first network through an NAS message, the instruction including: an instruction of performing a reselection to the second network.

In some alternative embodiments, the RRC message is an RRC connection release message.

In some alternative embodiments, the instruction sent by the base station in the first network through the RRC message is sent when the first network fails to switch among different access technologies.

In a third aspect, an embodiment of the present disclosure provides an information processing device in a user equipment (UE) operating in a single registration mode, including: a receiving module for receiving assistance information from a first network; a processing module for initiating an attaching or initial registration procedure according to the assistance information received from the first network when the UE is moving between the first network and a second network, the first and second networks utilizing different access technologies.

In some alternative embodiments, the processing module includes: a determination sub-module for determining whether the UE in single registration mode can be supported in the first network according to the assistance information received from the first network; a processing sub-module for initiating the attaching or initial registration procedure when accessing the second network, if the UE in single registration mode cannot be supported in the first network.

In some alternative embodiments, the assistance information includes: NAS level indication or registration mode negotiated on the NAS level; the determination sub-module is configured to determine whether the UE in single registration mode can be supported in the first network according to the NAS level indication or a result of the registration mode negotiation.

In some alternative embodiments, the assistance information includes: neighborhood measurement information; the determination sub-module is configured to determine that the UE in single registration mode cannot be supported in the first network, if the neighborhood measurement information does not include information about any cell of the access technology which the second network utilizes.

In some alternative embodiments, the processing module includes: a determination sub-module for determining whether an access to the second network is needed according to the assistance information received from the first network; a processing sub-module for initiating the attaching or initial registration procedure when accessing the second network, if the access to the second network is needed.

In some alternative embodiments, the assistance information includes: an instruction sent by a base station in the first network through an RRC message, the instruction including: information about cells of the second network; or an indication that switching among different access technologies is not supported; or an instruction of performing a reselection to the second network.

In some alternative embodiments, the RRC message is an RRC connection release message.

In some alternative embodiments, the instruction is sent when the first network fails to switch among different access technologies.

In some alternative embodiments, the assistance information includes: an instruction sent by a core network in the first network through an NAS message, the instruction including: an instruction of performing a reselection to the second network.

In a fourth aspect, an embodiment of the present disclosure provides an information processing device in a network-side equipment of a first network, including: an acquisition module for acquiring assistance information; a sending module for sending the assistance information to a UE operating in a single registration mode, the UE initiating an attaching or initial registration procedure according to the assistance information received from the first network when moving between the first network and a second network.

In some alternative embodiments, the assistance information includes: NAS level indication or registration mode negotiated on the NAS level; or the assistance information includes: neighborhood measurement information; or the assistance information includes: an instruction sent by a base station in the first network through an RRC message, the instruction including: information about cells of the second network; or an indication that switching among different access technologies is not supported; or an instruction of performing a reselection to the second network; or the assistance information includes: an instruction sent by a core network in the first network through an NAS message, the instruction including: an instruction of performing a reselection to the second network.

In some alternative embodiments, the RRC message is an RRC connection release message.

In some alternative embodiments, the instruction sent by the base station in the first network through the RRC message is sent when the first network fails to switch among different access technologies.

In a fifth aspect, an embodiment of the present disclosure provides a user equipment including a processor, a storage and a transceiver, wherein, the processor is configured to read a program in the storage to execute processes as follows: receiving assistance information from a first network by the transceiver; initiating an attaching or initial registration procedure according to the assistance information received from the first network when the user equipment is moving between the first network and a second network, the first and second networks utilizing different access technologies; the transceiver is configured to receive and send data.

In a sixth aspect, an embodiment of the present disclosure provides a network-side equipment including a processor, a storage and a transceiver, wherein, the processor is configured to read a program in the storage to execute processes as follows: receiving assistance information; sending the assistance information to a UE operating in a single registration mode by the transceiver, the UE initiating an attaching or initial registration procedure according to the assistance information received from the first network when moving between the first network and a second network; the transceiver is configured to receive and send data.

The beneficial effects of the foregoing technical solutions of the present disclosure are as follows: in the embodiments of the present disclosure, when moving between the first network and the second network, the UE initiates an attaching or initial registration procedure according to the assistance information of the first network, thereby avoiding a problem of mobility management failure when the UE is moving among networks of different access technologies, and ensuring the communication quality.

DETAILED DESCRIPTION

The specific embodiments of the present disclosure may be further described hereinafter in details in conjunction with the drawings. The embodiments described below are merely an illustration of the present disclosure rather than a limitation thereof.

Figure 1:
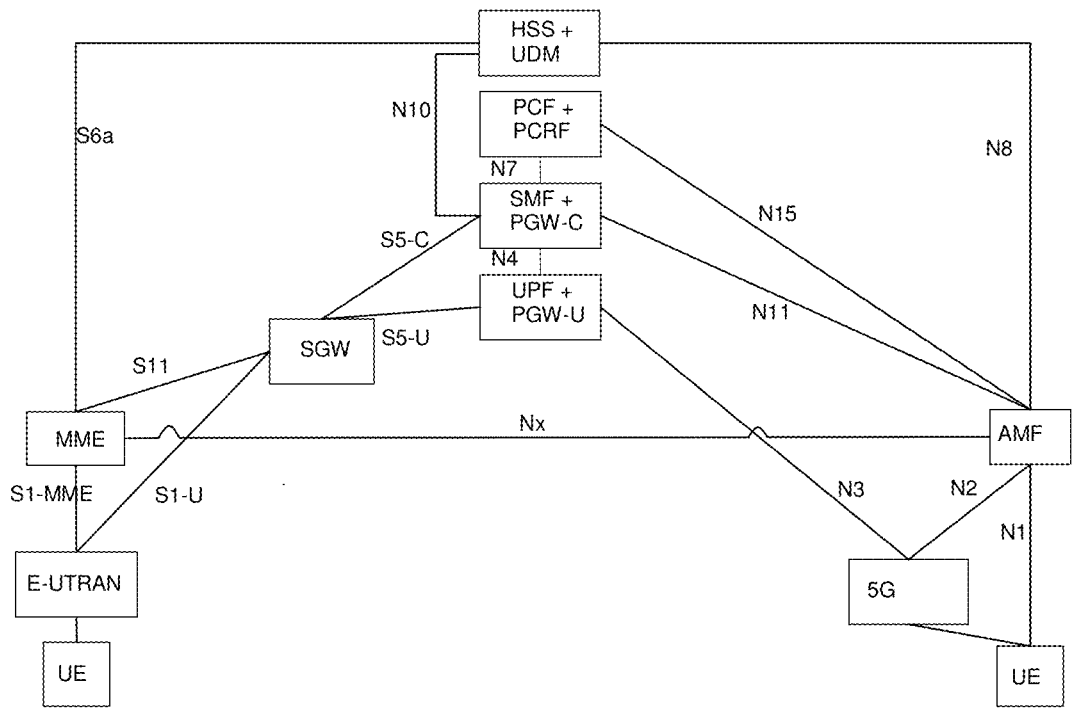
FIG. 1 is a schematic diagram of a network architecture model supporting an interoperation between 5G networks and LTE networks.

FIG. 1 is a schematic diagram of a network architecture model supporting an interoperation between 5G networks and LTE networks.

In FIG. 1, an Nx interface between an MME (Mobility Management Entity) and a 5G System (5GS) AMF (Access and Mobility Management Function) is optionally supported. When the network supports the Nx interface, the network can support the switching between the 5G network and the LTE network. In this case, the context information of a UE (User Equipment) needs to be transmitted between the MME and the AMF, which includes the context of the mobility and the context of the session connection. When the UE accesses such a network supporting the Nx interface, the network may be configured in a single registration mode.

When the network does not support the Nx interface, switching between the 5G network and the LTE network is not supported. In order to support the interoperation, the network needs to require the terminal to perform dual registration mode, that is, to be registered to both the LTE network and the 5G network. Considering the support for service continuity in the dual registration mode, the SMF (Session Management Function) of the control plane in the network is required to simultaneously support the functions of the PDN Gate Way-Control plane (PGW-C). In this way, the "HO registration" can ensure that when the UE moves between the LTE network and the 5G network, its session connection is always anchored on a same user plane anchor point.

The dual-registered UEs are further classified into UEs having a single radio capability and UEs having a dual radio capability. A single-radio terminal can only maintain one-side session connection at the same time, that is, can only maintain the connection in the LTE network or the connection in the 5G network. In this way, if the terminal moves between the LTE network and the 5G network, packet loss will inevitably occur, and seamless service continuity cannot be guaranteed. However, a dual-radio terminal can maintain the connections in the LTE network and the 5G network at the same time. Therefore, when it moves between the networks, the connection can be switched in the make-before-break manner, that is, while receiving data from the network to which is switched, data is also received from the previous network, so that the connection of the services can be guaranteed.

When a UE supporting the single registration mode is in an idle state, if an E-UTRAN access is selected, the UE will perform a TAU process. However, if the Nx interface is not supported in the 5GC network and the EPC network, the TAU process of the UE will be rejected, which will cause the UE to perform cell reselection or re-initiate an attaching process, thereby adding additional signaling overhead, delaying the acquisition of network services of the UE, particularly when the UE performs a ping-pong movement between the 5GS network and the EPS network. For the connected UE that supports the single registration mode, it is not yet discussed how to deal with the situation where an Nx interface between the 5GC network and the EPC network is not supported, and a problem of mobility management failure may also occur.

In view of this, some embodiments of the present disclosure provide an information processing method and device to avoid the problem of mobility management failure when a terminal is moving among networks of different access technologies, thereby ensuring the communication quality.

Figure 2:
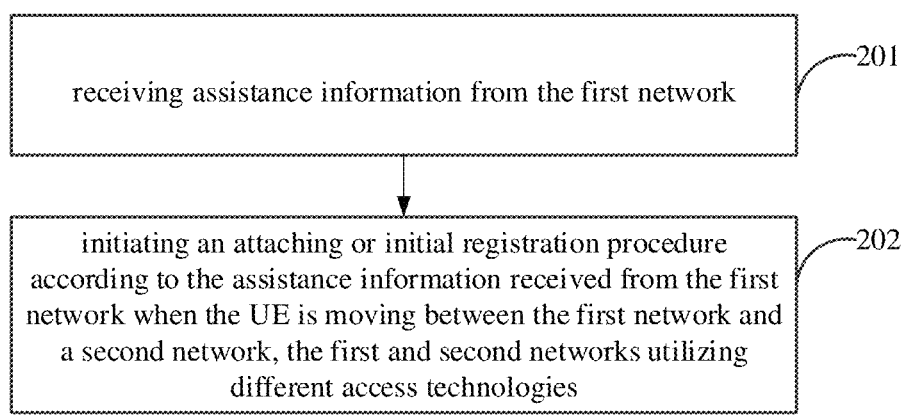
FIG. 2 is a flowchart of an information processing method according to an embodiment of the present disclosure.

As shown in FIG. 2, an information processing method according to an embodiment of the present disclosure is n a user equipment (UE) operating in a single registration mode. The method includes: Step 201, receiving assistance information from a first network; Step 202, initiating an attaching or initial registration procedure according to the assistance information received from the first network when the UE is moving between the first network and a second network, the first and second networks utilizing different access technologies.

In the embodiment of the present disclosure, the initial registration procedure refers to a registration procedure carrying a Subscriber Permanent Identifier (SUPI) that is initiated by a terminal.

In some embodiments, the first network is the 5G network, and the second network is the LET network. However, it should be noted that, with the development of technology, the first network and the second network may also change.

In Step 202, it is determined whether the UE in single registration mode can be supported in the first network according to the assistance information received from the first network; for example, it is determined whether the first network supports the Nx interface. If the UE in single registration mode cannot be supported in the first network, the attaching or initial registration procedure is initiated when accessing the second network.

In the embodiment of the present disclosure, the assistance information includes: non-access stratum (NAS) level indication or registration mode negotiated on the non-access stratum (NAS) level. Specifically, the step of determining whether the UE in single registration mode can be supported in the first network according to the assistance information received from the first network may particularly be as follows: determining whether the UE in single registration mode can be supported in the first network according to the non-access stratum (NAS) level indication or a result of the registration mode negotiation. If the result or indication of the registration mode negotiation indicates that UE in single registration mode can be supported, it is determined that the first network supports the UE in the single registration mode; otherwise, it is determined that the UE in single registration mode cannot be supported in the first network.

In the embodiment of the present disclosure, the assistance information includes: neighborhood measurement information. Specifically, the step of determining whether the UE in single registration mode can be supported in the first network according to the assistance information received from the first network may be: determining that the UE in single registration mode cannot be supported in the first network, if the neighborhood measurement information does not include information about any cell of the access technology which the second network utilizes.

In Step 202, it is determined whether an access to the second network is needed according to the assistance information received from the first network; if the access to the second network is needed, the attaching or initial registration procedure is initiated when accessing the second network. In an embodiment of the present disclosure, the assistance information includes: an instruction sent by a base station in the first network through a Radio Resource Control (RRC) message. The instruction includes: information about cells of the second network; or an indication that switching among different access technologies is not supported; or an instruction of performing a reselection to the second network. In practical applications, the RRC message is an RRC connection release message, and the instruction is sent when the first network fails to switch among different access technologies.

In an embodiment of the present disclosure, the assistance information includes: an instruction sent by a core network in the first network through an NAS message. The instruction includes: an instruction of performing a reselection to the second network.

In the embodiment of the present disclosure, when moving between the first network and the second network, the UE initiates an attaching or initial registration procedure according to the assistance information received from the first network, thereby avoiding a problem of mobility management failure when the UE is moving among networks of different access technologies, and ensuring the communication quality.

Figure 3:
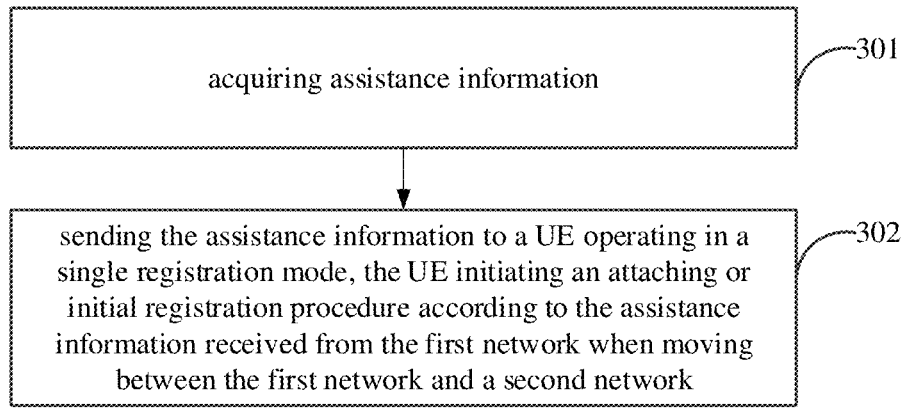
FIG. 3 is a flowchart of an information processing method according to an embodiment of the present disclosure.

As shown in FIG. 3, an information processing method according to an embodiment of the present disclosure is n a network-side equipment of a first network, and includes: Step 301, acquiring assistance information; Step 302, sending the assistance information to a UE operating in a single registration mode, the UE initiating an attaching or initial registration procedure according to the assistance information received from the first network when moving between the first network and a second network.

In an embodiment of the present disclosure, the assistance information includes: NAS level indication or registration mode negotiated on the NAS level; or the assistance information includes: neighborhood measurement information; or the assistance information includes: an instruction sent by a base station in the first network through an RRC message, the instruction including: information about cells of the second network; or an indication that switching among different access technologies is not supported; or an instruction of performing a reselection to the second network; or the assistance information includes: an instruction sent by a core network in the first network through an NAS message, the instruction including: an instruction of performing a reselection to the second network.

In the embodiment, the RRC message is an RRC connection release message. The instruction sent by the base station in the first network through the RRC message is sent when the first network fails to switch among different access technologies.

In the embodiment of the present disclosure, when moving between the first network and the second network, the UE initiates an attaching or initial registration procedure according to the assistance information received from the first network, thereby avoiding a problem of mobility management failure when the UE is moving among networks of different access technologies, and ensuring the communication quality.

Figure 4:
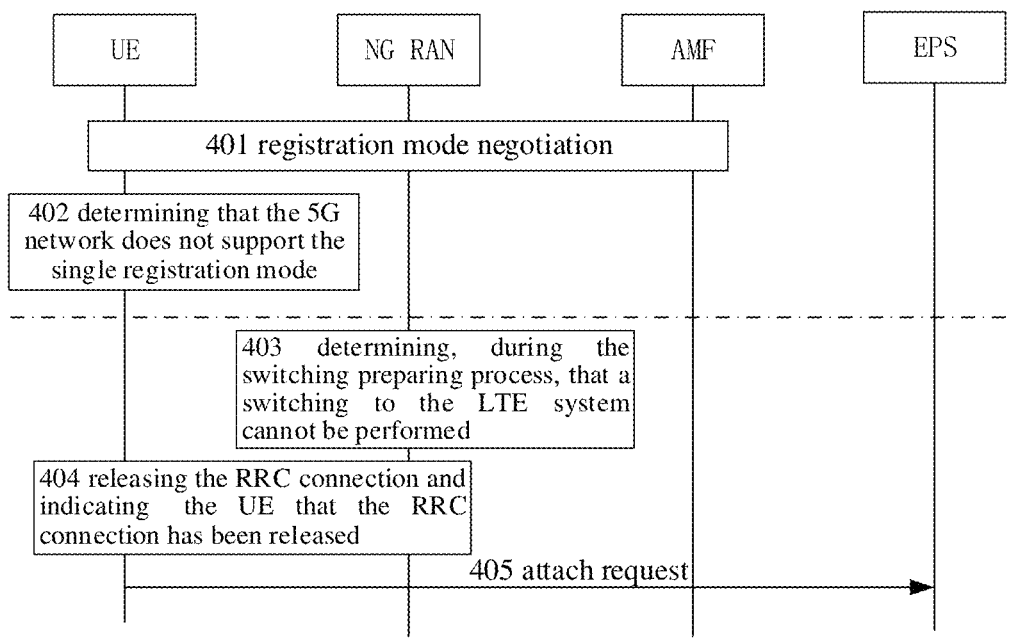
FIG. 4 is a flowchart of an information processing method according to an embodiment of the present disclosure.

As shown in FIG. 4, the embodiment of the present disclosure describes an example in which the UE performs registration mode negotiation with the 5GS and performs connection state movement to the EPS. The method includes the following steps.

Step 401, first, registering a UE operating in a single registration mode to the 5G network and performing registration mode negotiation with the network. According to a result of the registration mode negotiation, the AMF indicates to the UE that the Nx interface is not supported, that is, the single registration mode is not supported. The registration mode negotiation is an optional step. For example, the UE only supports the single registration mode, and thus the UE does not need to provide the registration mode information to the network. The 5G network determines, according to its own capability, that the single registration mode cannot be supported, and indicates to the UE that the Nx interface or the single registration mode is not supported.

Step 402, the UE determines, according to the NAS level indication or a result of the registration mode negotiation or, that the 5G network does not support the single registration mode.

Step 403, an NG RAN prepares to initiate a switching process. However, since the AMF does not support the single registration mode, the NG RAN determines that the switching to a EPS (Evolved Packet System) cannot be performed.

Step 404, the NG RAN releases the RRC connection of the UE, and sends the RRC connection release message to the UE.

The RRC connection release message includes: information about cells of the second network; or an indication that switching among different access technologies is not supported; or an instruction of performing a reselection to the second network.

The UE releases the RRC connection.

Step 405, the UE determines, according to the instruction information received from the NG RAN, to perform an attaching process to the EPS.

Figure 5:
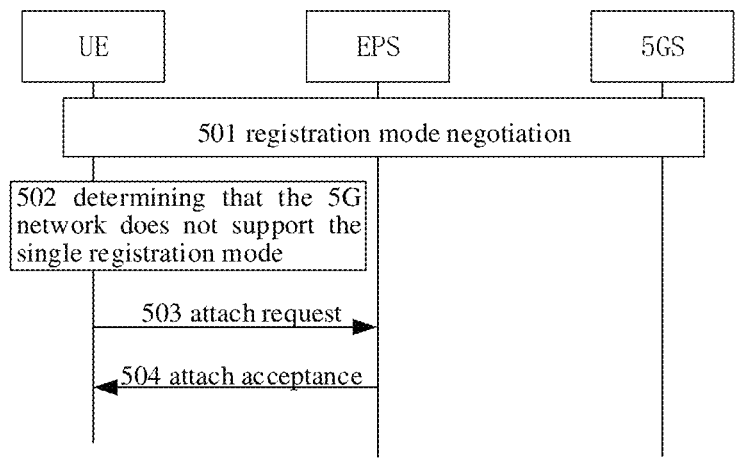
FIG. 5 is a flowchart of an information processing method according to an embodiment of the present disclosure.

As shown in FIG. 5, the embodiment of the present disclosure describes an example in which the UE performs registration mode negotiation in the 5GS and performs idle state movement to the EPS. The method includes: Step 501, first, registering a UE operating in a single registration mode to the 5G network, and performing registration mode negotiation with the network. According to the result of the registration mode negotiation, the 5GS indicates to the UE that the single registration mode is not supported. Step 502, the UE determines, according to the NAS level indication or a result of the registration mode negotiation, that the 5G network does not support the single registration mode. Step 503, according to the NAS level indication or a result of the registration mode negotiation, performing an attaching process instead of a TAU (Tracking Area Update) process, when the UE moves into a coverage of the EPS network, and the UE sends an attach request to the EPS. Step 504, the EPS sends an Attach Accept to the UE.

Figure 6:
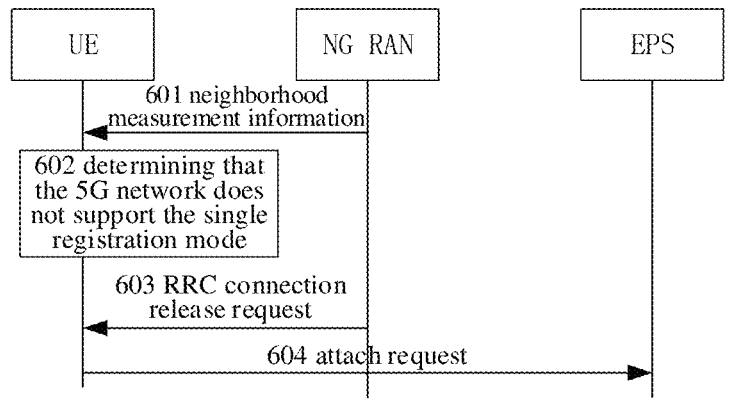
FIG. 6 is a flowchart of an information processing method according to an embodiment of the present disclosure.

As shown in FIG. 6, the embodiment of the present disclosure describes an example in which the UE is registered in the 5GS and performs connection state movement to the EPS. The method includes: Step 601, the UE in the connection state acquiring neighborhood measurement information from the NG RAN; Step 602, the UE in the connection state determining, according to the neighborhood measurement information provided by the NG RAN, that the measured cell does not include any information about cells of the E-UTRA, and thus determining that the 5G network does not support an interoperation with the EPS, that is, does not support a single registration mode; Step 603, the NG RAN abandoning switching since no suitable target cell can be found, releasing the RRC connection, and sending an RRC connection release request to the UE; Step 604, the UE selecting an E-UTRA cell according to the RRC connection release request, and initiating an attaching process.

Figure 7:
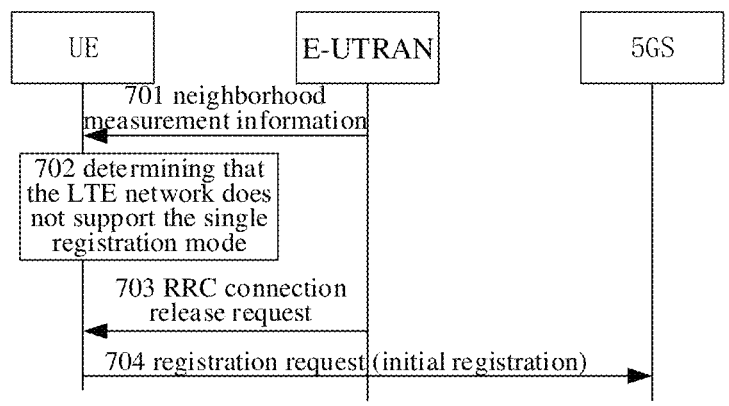
FIG. 7 is a flowchart of an information processing method according to an embodiment of the present disclosure.

As shown in FIG. 7, the embodiment of the present disclosure describes an example in which a UE attaches to an EPS and performs connection state movement to a 5GS. The method includes: Step 701, the UE in the connection state acquiring neighborhood measurement information from the E-UTRAN; Step 702, the UE in the connection state determining, according to the neighborhood measurement information provided by the E-UTRAN, that the measured cell does not include any information about cells of NR, and thus determining that the LTE network does not support an interoperation with the 5GS, that is, does not support a single registration mode; Step 702, the E-UTRAN abandoning switching since no suitable target cell can be found, releasing the RRC connection, and sending an RRC connection release request to the UE; Step 703, the UE selecting an NR cell according to the RRC connection release request, and initiating an attaching process.

Figure 8:
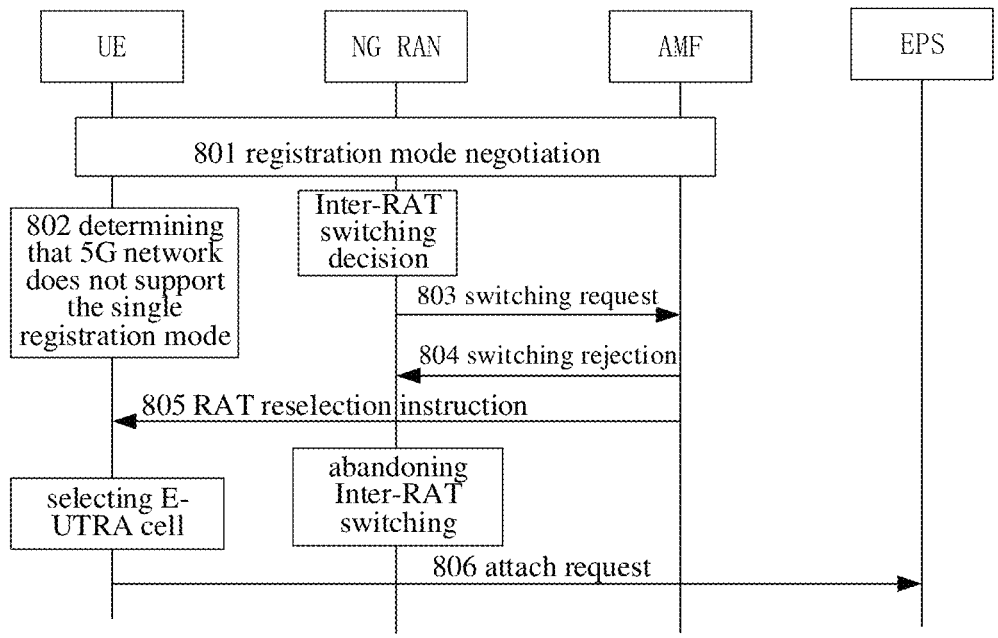
FIG. 8 is a flowchart of an information processing method according to an embodiment of the present disclosure.

As shown in FIG. 8, the embodiment of the present disclosure describes an example in which the AMF instructs a UE to perform connection state movement. The scenario is as follows: The NG RAN has configured information about the E-UTRA cell, but the AMF does not deploy the Nx interface. The method includes: Step 801, first, registering a UE operating in the single registration mode to the 5G network, and performing registration mode negotiation with the network. If the 5GS does not support the Nx interface, the 5GS indicates to the UE that the single registration mode is not supported. Step 802, the UE determines, according to the NAS level indication or a result of the registration mode negotiation, that the 5G network does not support the single registration mode. Step 803, the NG RAN performs switching decision, determines to initiate a switching process, and sends a switching request message to the AMF. Step 804, the AMF rejects switching since the AMF does not support the single registration mode, and sends a switching rejection message to the NG RAN. Step 805, the AMF sends an RAT (Radio Access Technology) reselection instruction to the UE, wherein the instruction is sent by using the NAS message. Step 806, the UE determines to perform an attaching process to the EPS according to the RAT reselection instruction as sent.

In this embodiment, the UE determines whether to perform access to the EPS according to the RAT reselection instruction, and if necessary, initiates an attaching or initial registration procedure when accessing the EPS network.

In the embodiment of the present disclosure, when moving between the first network and the second network, the UE initiates an attaching or initial registration procedure according to the assistance information received from the first network, thereby avoiding a problem of mobility management failure when the UE is moving among networks of different access technologies, and ensuring the communication quality.

Figure 9:
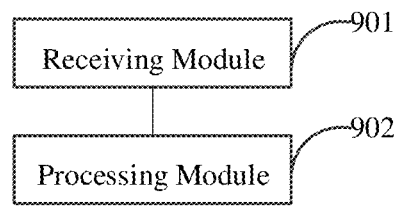
FIG. 9 is a schematic diagram of an information processing device according to an embodiment of the present disclosure.

As shown in FIG. 9, an information processing device according to an embodiment of the present disclosure is implemented in a user equipment (UE) operating in a single registration mode, and includes: a receiving module 901 for receiving assistance information from a first network; a processing module 902 for initiating an attaching or initial registration procedure according to the assistance information received from the first network when the UE is moving between the first network and a second network, the first and second networks utilizing different access technologies.

Wherein the processing module 902 includes: a determination sub-module for determining whether the UE in single registration mode can be supported in the first network according to the assistance information received from the first network; a processing sub-module for initiating the attaching or initial registration procedure when accessing the second network, if the UE in single registration mode cannot be supported in the first network.

Wherein the assistance information includes NAS level indication or registration mode negotiated on the NAS level; the determination sub-module is specifically configured to determine whether the UE in single registration mode can be supported in the first network according to the NAS level indication or a result of the registration mode negotiation.

Wherein the assistance information includes neighborhood measurement information; the determination sub-module is specifically configured to determine that the UE in single registration mode cannot be supported in the first network, if the neighborhood measurement information does not include information about any cell of the access technology which the second network utilizes.

Wherein the processing module 902 include: a determination sub-module for determining whether an access to the second network is needed according to the assistance information received from the first network; a processing sub-module for initiating the attaching or initial registration procedure when accessing the second network, if the access to the second network is needed.

Wherein the assistance information includes an instruction sent by a base station in the first network through an RRC message, and the instruction includes: information about cells of the second network; or an indication that switching among different access technologies is not supported; or an instruction of performing a reselection to the second network.

Wherein the RRC message is an RRC connection release message.

Wherein the assistance information includes an instruction sent by a core network in the first network through an NAS message, and the instruction includes: an instruction of performing a reselection to the second network.

The working principle of the device according to the present disclosure has been described in the foregoing method embodiments.

In the embodiment of the present disclosure, when moving between the first network and the second network, the UE initiates an attaching or initial registration procedure according to the assistance information received from the first network, thereby avoiding a problem of mobility management failure when the UE is moving among networks of different access technologies, and ensuring the communication quality.

Figure 10:
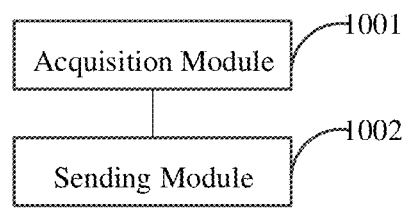
FIG. 10 is a schematic diagram of an information processing device according to an embodiment of the present disclosure.

As shown in FIG. 10, an information processing device according to an embodiment of the present disclosure is implemented in a network-side equipment of a first network, and includes: an acquisition module 1001 for acquiring assistance information; and a sending module 1002 for sending the assistance information to a UE operating in a single registration mode, wherein the UE initiates an attaching or initial registration procedure according to the assistance information received from the first network when moving between the first network and a second network.

The assistance information includes NAS level indication or registration mode negotiated on the NAS level; or the assistance information includes neighborhood measurement information; or the assistance information includes an instruction sent by a base station in the first network through an RRC message, and the instruction includes: information about cells of the second network; or an indication that switching among different access technologies is not supported; or an instruction of performing a reselection to the second network; or the assistance information includes an instruction sent by a core network in the first network through an NAS message, instructing to perform a reselection to the second network.

The RRC message is an RRC connection release message.

The instruction sent by the base station in the first network through the RRC message is sent when the first network fails to switch among different access technologies.

The operation principle of the device according to the present disclosure has been described in the foregoing method embodiments.

In the embodiment of the present disclosure, when moving between the first network and the second network, the UE initiates an attaching or initial registration procedure according to the assistance information received from the first network, thereby avoiding a problem of mobility management failure when the UE is moving among networks of different access technologies, and ensuring the communication quality.

Figure 11:
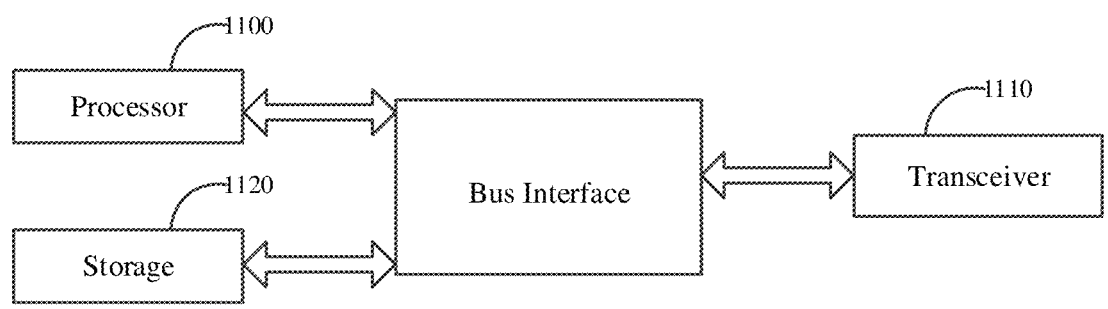
FIG. 11 is a schematic diagram of a network-side equipment according to an embodiment of the present disclosure.

As shown in FIG. 11, an embodiment of the present disclosure provides a network-side equipment including a processor 1100 which is configured to read a program in a storage 1120 to execute processes as follows: acquiring assistance information; sending the assistance information to a UE operating in a single registration mode by a transceiver 1110, the UE initiating an attaching or initial registration procedure according to the assistance information received from the first network when moving between the first network and a second network. The transceiver 1100 is configured to receive and send data.

In FIG. 11, the bus architecture may include any number of interconnected buses and bridges, which are specifically linked by various circuits such as the processor 1100 (which is an example of the one or more processors) and the storage 1120 (which is an example of the storage). The bus architecture may also link various other circuits such as peripherals, voltage regulators, and power management circuits, which are well known in the art and is therefore omitted herein. The bus interface provides an interface. The transceiver 1110 may be a plurality of elements, including a transmitter and a transceiver, and providing units for communicating with various other devices over a transmission medium. The processor 1100 is responsible for managing the bus architecture and general processing, and the memory 1120 may store data used by the processor 1100 in performing operations.

The processor 1100 is responsible for managing the bus architecture and general processing, and the memory 1120 may store data used by the processor 1100 in performing operations.

Figure 12:
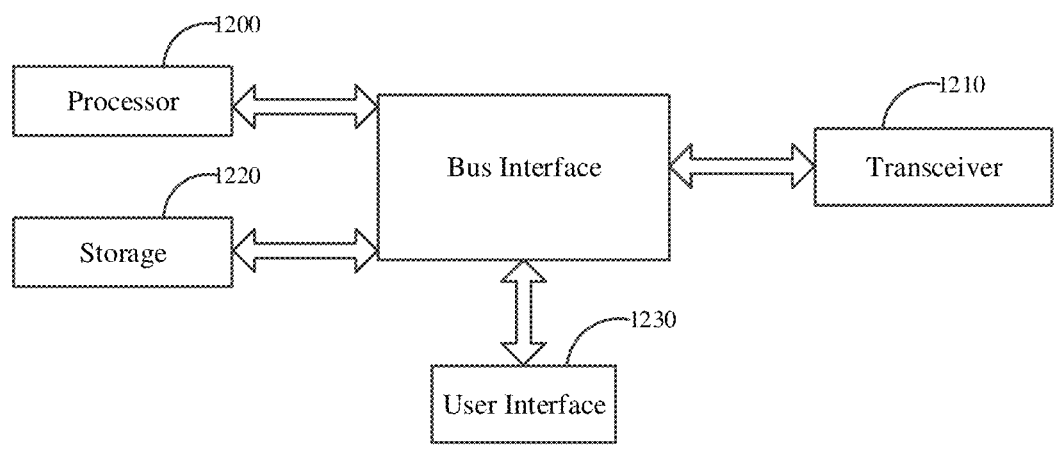
FIG. 12 is a schematic diagram of a user equipment according to an embodiment of the present disclosure.

As shown in FIG. 12, a user equipment according to an embodiment of the present disclosure includes: a processor 1200 which is configured to read a program in a storage 1220 to execute processes as follows: receiving assistance information from a first network by a transceiver 1210; initiating an attaching or initial registration procedure according to the assistance information received from the first network when the user equipment is moving between the first network and a second network, the first and second networks utilizing different access technologies; and a transceiver 1210, which is configured to receive and send data under the control of the processor 1200.

In FIG. 12, the bus architecture may include any number of interconnected buses and bridges, which are specifically linked by various circuits such as the processor 1200 (which is an example of the one or more processors) and the storage 1220 (which is an example of the storage). The bus architecture may also link various other circuits such as peripherals, voltage regulators, and power management circuits, which are well known in the art and, therefore, will not be further described herein. The bus interface provides an interface. The transceiver 1210 may be a plurality of elements, including a transmitter and a transceiver, and providing units for communicating with various other devices over a transmission medium. For different user equipments, the user interface 1230 may also be an interface capable of connecting externally or internally the required devices, including but not limited to a keypad, a display, a speaker, a microphone, a joystick, and the like.

The processor 1200 is responsible for managing the bus architecture and general processing, and the memory 1220 may store data used by the processor 1200 in performing operations.

The processor 1200 is further configured to determine whether the UE in single registration mode can be supported in the first network according to the assistance information received from the first network; and initiate the attaching or initial registration procedure when accessing the second network, if the UE in single registration mode cannot be supported in the first network.

The assistance information includes: NAS level indication or registration mode negotiated on the NAS level; and the processor 1200 is further configured to determine whether the UE in single registration mode can be supported in the first network according to the NAS level indication or a result of the registration mode negotiation.

The assistance information includes neighborhood measurement information; and the processor 1200 is further configured to determine that the UE in single registration mode cannot be supported in the first network, if the neighborhood measurement information does not include information about any cell of the access technology which the second network utilizes.

The processor 1200 is further configured to determine whether an access to the second network is needed according to the assistance information received from the first network; and initiate the attaching or initial registration procedure when accessing the second network, if the access to the second network is needed.

The assistance information includes an instruction sent by a base station in the first network through an RRC message, and the instruction includes: information about cells of the second network; or an indication that switching among different access technologies is not supported; or an instruction of performing a reselection to the second network.

The RRC message is an RRC connection release message.

The instruction is sent when the first network fails to switch among different access technologies.

The assistance information includes an instruction sent by a core network in the first network through an NAS message, instructing to perform a reselection to the second network.

The present disclosure further provides a computer-readable storage medium for storing a computer program which is executable by a processor to perform the information processing method according to any of the above embodiments.

In the several embodiments provided by the present application, it should be understood that the disclosed methods and devices can be implemented in other manners. For example, the device embodiments described above are merely illustrative. For example, the division of the units is only a logical functional division. In practical applications, there may be other division manners; for example, multiple units or components may be combined or may be integrated into another system, or some features may be ignored or not executed. In addition, the mutual coupling or direct coupling or communication connection shown or discussed may be an indirect coupling or communication connection through some interfaces, devices or units, and may be in an electrical, mechanical or other form.

In addition, the functional units in various embodiments of the present disclosure may be integrated into one processing unit, or each unit may be physically included separately, or two or more units may be integrated into one unit. The above integrated unit can be implemented in the form of hardware or in the form of hardware and software.

The above integrated unit implemented in the form of a software functional unit may be stored in a computer-readable storage medium. The above software functional unit is stored in a storage medium and includes a plurality of instructions for causing a computer device (which may be a personal computer, a server, or a network device, etc.) to perform part of the steps of the transceiving method of the various embodiments of the present disclosure. The foregoing storage medium includes various medium capable of storing program codes, such as a U disk, a mobile hard disk, a Read-Only Memory (ROM), a Random Access Memory (RAM), a magnetic disk or an optical disk, and the like.

The above describes preferred embodiments of the present disclosure, and it should be noted that those skilled in the art can also make many improvements and refinements without departing from the principle of the present disclosure. These improvements and refinements should also fall into the protective scope of the present disclosure.

What is claimed is:

1. An information processing method, performed by a user equipment (UE) operating in a single registration mode, comprising:
receiving assistance information from a core network of a first network;
initiating an attaching or initial registration procedure according to the assistance information received from the first network when the UE is moving between the first network and a second network, the first and second networks utilizing different access technologies;
wherein the step of initiating an attaching or initial registration procedure according to the assistance information received from the first network when the UE is moving between the first network and a second network comprises:
determining whether the UE in single registration mode can be supported in the first network according to the assistance information received from the first network;
initiating the attaching or initial registration procedure when accessing the second network, if the UE in single registration mode cannot be supported in the first network;
wherein when the assistance information comprises Non-Access Stratum (NAS) level indication, the NAS level indication indicates that the single registration mode is not supported, or instructs to perform a reselection to the second network; and
when the assistance information comprises registration mode negotiated on the NAS level, the step of determining whether the UE in single registration mode can be supported in the first network according to the assistance information received from the first network comprises determining whether the UE in single registration mode can be supported in the first network according to a result of the registration mode negotiation.

2. The method according to claim 1, wherein the step of initiating an attaching or initial registration procedure according to the assistance information received from a first network when the UE is moving between the first network and a second network comprises:
determining whether an access to the second network is needed according to the assistance information received from the first network;
initiating the attaching or initial registration procedure when accessing the second network, if the access to the second network is needed.

3. The method according to claim 2, wherein the assistance information comprises: an instruction sent by a base station in the first network through an RRC message, the instruction comprising:
information about cells of the second network; or an indication that switching among different access technologies is not supported; or an instruction of performing a reselection to the second network.

4. The method according to claim 3, wherein the RRC message is an RRC connection release message.

5. The method according to claim 4, wherein the instruction is sent when the first network fails to switch among different access technologies.

6. The method according to claim 1, wherein the assistance information comprises: an instruction sent by the core network in the first network through an NAS message, the instruction comprising: an instruction of performing a reselection to the second network.

7. A user equipment (UE) operating in a single registration mode, comprising a processor, a storage and a transceiver, wherein the transceiver is configured to receive and send data, and the processor is configured to read a program in the storage to execute the following processes:
receiving assistance information from a core network of a first network by the transceiver;
initiating an attaching or initial registration procedure according to the assistance information received from the first network when the user equipment is moving between the first network and a second network, the first and second networks utilizing different access technologies;
wherein the processor is configured to:
determine whether the UE in single registration mode can be supported in the first network according to the assistance information received from the first network;

initiate the attaching or initial registration procedure when accessing the second network, if the UE in single registration mode cannot be supported in the first network;

wherein when the assistance information comprises Non-Access Stratum (NAS) level indication the NAS level indication indicates that the single registration mode is not supported, or performing a reselection to the second network; and when the assistance information comprises registration mode negotiated on the NAS level, the processor is configured to determine whether the UE in single registration mode can be supported in the first network according to a result of the registration mode negotiation.

8. The UE according to claim 7, wherein the processor is configured to:

determine whether an access to the second network is needed according to the assistance information received from the first network;

initiate the attaching or initial registration procedure when accessing the second network, if the access to the second network is needed.

9. The UE according to claim 8, wherein the assistance information comprises: an instruction sent by a base station in the first network through an RRC message, the instruction comprising:

information about a target cell of a different access technology; or an indication that switching among different access technologies is not supported; or an instruction of performing a reselection to the second network.

10. An information processing method, performed by a user equipment (UE) operating in a single registration mode, comprising:

receiving assistance information from a first network;

initiating an attaching or initial registration procedure according to the assistance information received from the first network when the UE is moving between the first network and a second network, the first and second networks utilizing different access technologies;

wherein the step of initiating an attaching or initial registration procedure according to the assistance information received from the first network when the UE is moving between the first network and a second network comprises:

determining whether the UE in single registration mode can be supported in the first network according to the assistance information received from the first network;

initiating the attaching or initial registration procedure when accessing the second network, if the UE in single registration mode cannot be supported in the first network;

wherein when the assistance information comprises neighborhood measurement information, the step of determining whether the UE in single registration mode can be supported in the first network according to the assistance information received from the first network comprises determining that the UE in single registration mode cannot be supported in the first network, if the neighborhood measurement information does not comprise information about any cell of the access technology which the second network utilizes; and when the assistance information comprises registration mode negotiated on a Non-Access Stratum (NAS) level, the step of determining whether the UE in single registration mode can be supported in the first network according to the assistance information received from the first network comprises determining whether the UE in single registration mode can be supported in the first network according to a result of the registration mode negotiation.

* * * * *